No. 752,427. PATENTED FEB. 16, 1904.
L. H. STONER.
ANIMAL TROUGH.
APPLICATION FILED OCT. 1, 1902.
NO MODEL. 2 SHEETS—SHEET 2.
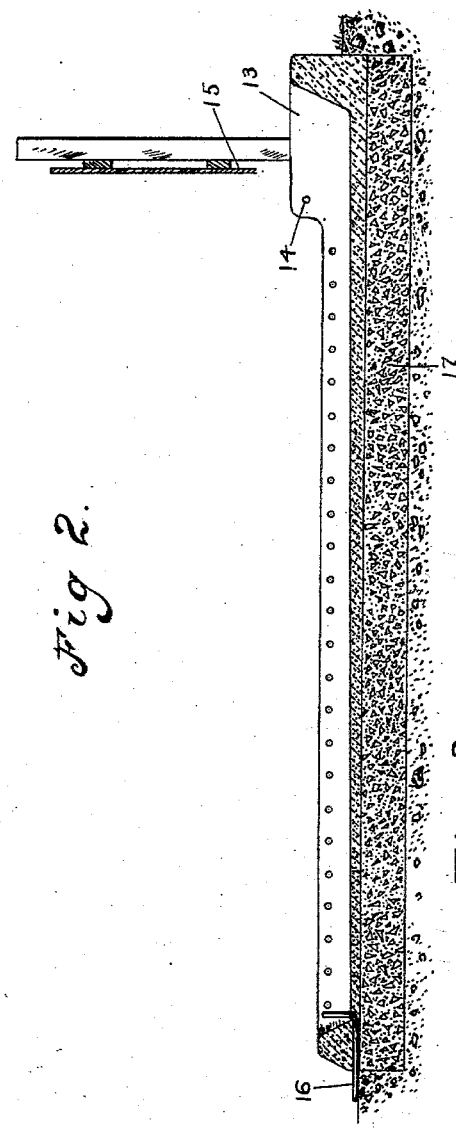
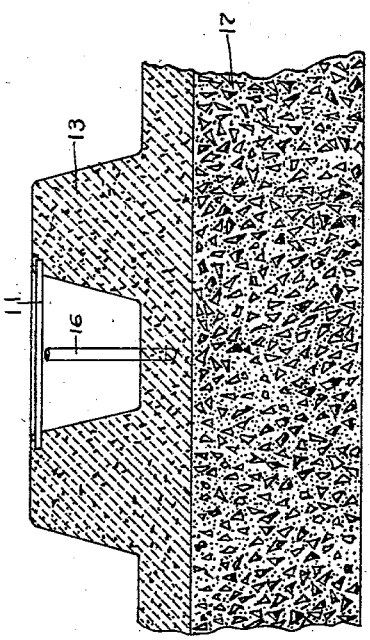
WITNESSES: INVENTOR
H. I. Pearces Lewis H. Stoner
Nellie Allemong. BY V. H. Lockwood
ATTORNEY No. 752,427. Patented February 16, 1904.

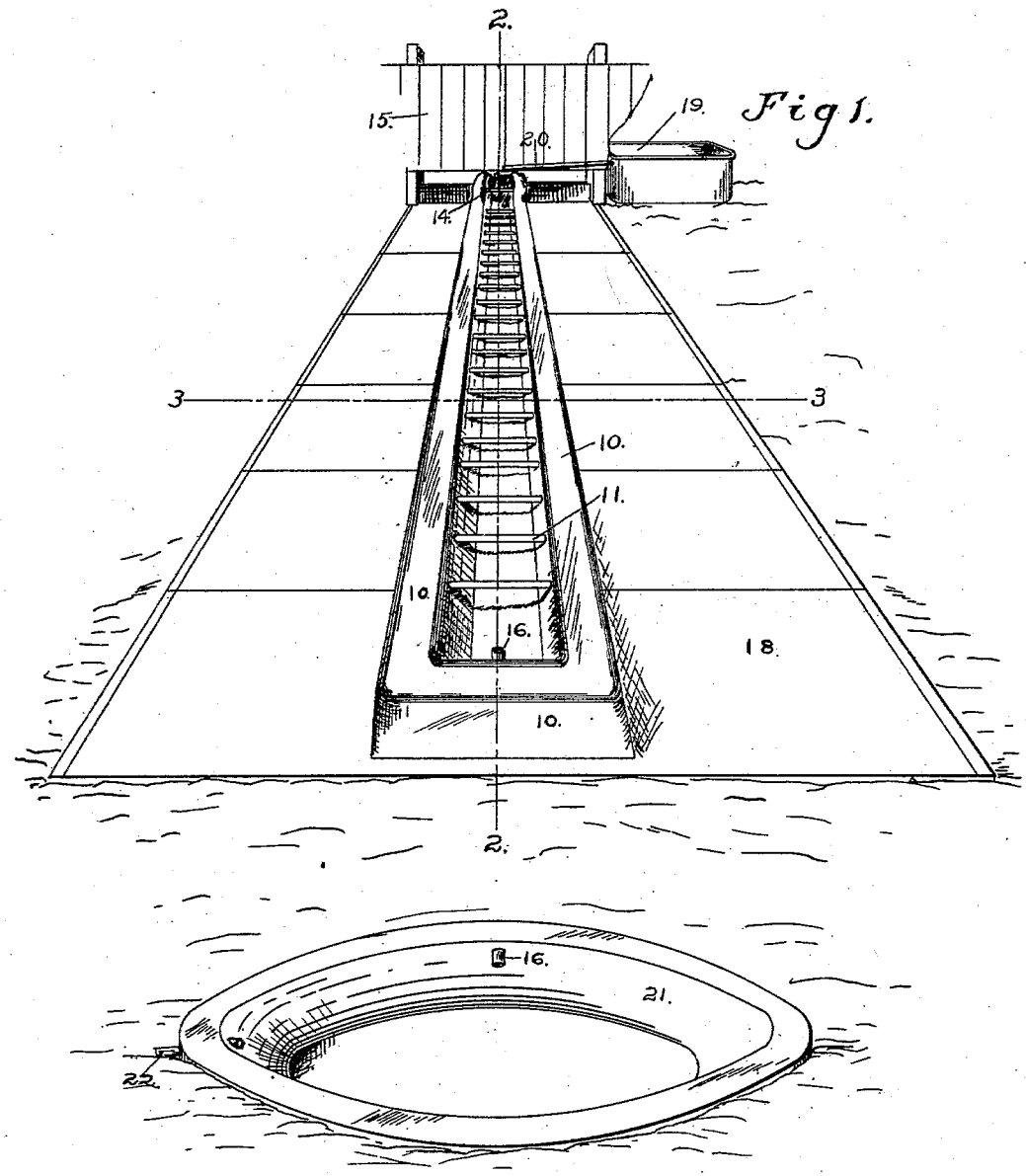

UNITED STATES PATENT OFFICE.

LEWIS H. STONER, OF ALBANY, INDIANA.

ANIMAL-TROUGH.

SPECIFICATION forming part of Letters Patent No. 752,427, dated February 16, 1904.

Application filed October 1, 1902. Serial No. 125,486. (No model.)

*To all whom it may concern:*

Be it known that I, LEWIS H. STONER, of Albany, county of Delaware, and State of Indiana, have invented a certain new and useful Animal-Trough; and I do hereby declare that the following is a full, clear, and exact description thereof, reference being had to the accompanying drawings, in which like figures refer to like parts.

The object of this invention is to provide a clean and durable means for feeding and watering animals, such as hogs. One of the great causes of cholera among hogs is considered to be due to the filthy water which they drink and wallow in. Among many farmers a desire has arisen for a clean arrangement or means for watering and feeding such stock, one free from stagnant water, capable of being cleaned, and so arranged that the surroundings will not become muddy or mud get into the trough or the hogs wallow in the trough.

The nature of this invention will be understood from the accompanying drawings and the following description and claims.

In the drawings, Figure 1 is a perspective of the apparatus. Fig. 2 is a vertical section on the line 2 2 of Fig. 1. Fig. 3 is a cross-section on the line 3 3 of said figure.

In carrying out this invention I provide in the first place a cement trough 10, with a series of metal cross-bars 11 embedded and molded therein, which are far enough apart to enable the animal to feed from the trough and which prevent the animals from crowding and from wallowing in the trough. At one end, the inlet end, of the trough I make the walls 13 of the trough higher than throughout the main body of the trough, so that the food, such as slops and the like, may be poured into the trough at that point, and the higher walls thereof will prevent it splashing out as it is being poured. At that end also I provide a cross-bar 14, as well as a transversely-placed fence 15, to prevent the animals from crowding up to interfere with the pouring in of the food. At the opposite extreme end of the trough I provide an overflow-pipe 16, which does not extend as high as the walls of the trough.

In building this trough I make an excavation in the ground several feet wider than the trough and considerably deeper and place a broken-stone concrete foundation 17, as is usual for cement-work. Upon this I build the cement trough, as has been specified, and properly round the upper corners or edges thereof, so it will not injure the animals while rubbing against it or feeding. I also place about the trough a cement floor 18, extending three or four feet on each side of the trough, so that the animals can stand upon a solid dry clean surface while feeding, and the trough will extend or be elevated above the floor. The approach to this floor is preferably covered with stones, so that it will be kept free from mud, and will be dry because there is no escaping water over the surface.

Water may be supplied from any suitable source, there being shown a water-tank 19, such as is usually fed by a windmill and pump. The overflow-pipe 20 extends from said tank to the upper end of the trough. The tank is used for watering animals and the overflow from the tank runs into the trough, and the overflow from the trough runs through the pipe 16 into the pool 21, which I make also of cement. It is designed also as a wallowing place for hogs for the purpose of cleaning them instead of making them filthy. The overflow from it is through the outlet-pipe 22. The size of the wallowing-pool may be increased as desired, but should not be very deep.

What I claim as my invention, and desire to secure by Letters Patent, is—

1. An animal-trough formed of a concrete foundation, a cement trough built upon said foundation, and a cement floor built on said foundation on each side of said trough, said trough extending above the floor.

2. An animal-trough formed of cement with one end wall and the side walls adjacent to said end wall made high for the introduction of material into the trough, metal rods molded in the lower portion of the trough that extend from one side to the other thereof at suitable distances apart, and a cross-bar molded in the elevated portion of said trough adjacent the lower portion thereof.

3. An animal-trough formed of cement with one end wall and the adjacent side walls thereof made high for the introduction of material into the trough, metal rods molded in the trough that extend from one side to the other thereof at intervals, and a transversely-placed partition located over the elevated portion of said trough at a point removed from the extreme end thereof so that material may be introduced into the trough behind said partition without the interference of animals.

In witness whereof I have hereunto affixed my signature in the presence of the witnesses herein named.

LEWIS H. STONER.

Witnesses:
V. H. LOCKWOOD,
NELLIE ALLEMONG.